(12) United States Patent
Aoki (10) Patent No.: US 12,162,040 B2
(45) Date of Patent: Dec. 10, 2024

(54) PROCESSING METHOD AND PROCESSING DEVICE FOR ELECTRONIC/ELECTRICAL DEVICE COMPONENT SCRAP

(71) Applicant: JX ADVANCED METALS CORPORATION, Tokyo (JP)

(72) Inventor: Katsushi Aoki, Hitachi (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 11 days.

(21) Appl. No.: 17/605,419

(22) PCT Filed: Apr. 22, 2020

(86) PCT No.: PCT/JP2020/017390
§ 371 (c)(1),
(2) Date: Oct. 21, 2021

(87) PCT Pub. No.: WO2020/218376
PCT Pub. Date: Oct. 29, 2020

(65) Prior Publication Data
US 2022/0203405 A1 Jun. 30, 2022

(30) Foreign Application Priority Data
Apr. 22, 2019 (JP) .................. 2019-081346

(51) Int. Cl.
*B07C 5/342* (2006.01)
*B07C 5/10* (2006.01)
(Continued)

(52) U.S. Cl.
CPC .............. *B07C 5/342* (2013.01); *B07C 5/10* (2013.01); *B07C 5/344* (2013.01); *B07C 5/36* (2013.01);
(Continued)

(58) Field of Classification Search
CPC . B07C 5/342; B07C 5/344; B07C 2501/0054; B07C 2501/0063; B25J 9/1697
(Continued)

(56) References Cited

U.S. PATENT DOCUMENTS 5,911,327 A * 6/1999 Tanaka ................. G01J 3/50
209/582
2002/0060465 A1 5/2002 Laliberte et al.
(Continued)

FOREIGN PATENT DOCUMENTS

CN 106391657 A 2/2017
DE 4244449 A1 * 6/1994 ............. B03B 9/061
(Continued)

OTHER PUBLICATIONS

Van Looy; Eric, "Multi-task Automatic Collection Sortation for Sorting Bulk Materials (English Translation)", Dec. 6, 2012, iq.ip. com (Year: 2012).*
(Continued)

*Primary Examiner* — Michael McCullough
*Assistant Examiner* — Molly K Devine
(74) *Attorney, Agent, or Firm* — Birch, Stewart, Kolasch & Birch, LLP (57) ABSTRACT

Provided is a method for processing electronic and electrical device component scrap according to an embodiment of the present invention includes a smelting raw material sorting step of sorting a processing raw material containing valuable metals processable in a smelting step from the electronic and electrical device component scrap, wherein the method comprises removing lump copper wire scrap contained in the electronic and electrical device component scrap using a parallel link robot.

9 Claims, 5 Drawing Sheets

(51) Int. Cl.

| | | |
|---|---|---|
| *B07C 5/344* | (2006.01) | |
| *B07C 5/36* | (2006.01) | |
| *B09B 5/00* | (2006.01) | |
| *B25J 9/00* | (2006.01) | |
| *B25J 9/16* | (2006.01) | |
| *B25J 11/00* | (2006.01) | |
| *B25J 15/00* | (2006.01) | |
| *B25J 15/02* | (2006.01) | |
| *C22B 1/00* | (2006.01) | |
| *C22B 7/00* | (2006.01) | |
| *G06T 7/00* | (2017.01) | |
| *G06T 7/90* | (2017.01) | |

(52) U.S. Cl.
CPC ............. *B25J 9/003* (2013.01); *B25J 9/0093* (2013.01); *B25J 9/1697* (2013.01); *B25J 15/0052* (2013.01); *C22B 7/005* (2013.01); *G06T 7/001* (2013.01); *G06T 7/90* (2017.01); *B07C 2501/0054* (2013.01); *B07C 2501/0063* (2013.01); *B25J 15/0293* (2013.01); *G06T 2207/30136* (2013.01); *G06T 2207/30164* (2013.01); *Y02P 10/20* (2015.11)

(58) Field of Classification Search
USPC .......................................................... 209/580
See application file for complete search history.

(56) References Cited

U.S. PATENT DOCUMENTS

| | | | |
|---|---|---|---|
| 2016/0096298 A1 | 4/2016 | Uchiyama | |
| 2017/0259274 A1* | 9/2017 | Adams | .................... B02C 23/10 |

FOREIGN PATENT DOCUMENTS

| | | | |
|---|---|---|---|
| DE | 10 2015 012 764 A1 | 4/2016 | |
| EP | 0 588 150 A1 | 3/1994 | |
| JP | 7-256231 A | 10/1995 | |
| JP | 9-78151 A | 3/1997 | |
| JP | 2000135450 A * | 5/2000 | |
| JP | 2002-105548 A | 4/2002 | |
| JP | 2003-534930 A | 11/2003 | |
| JP | 2012-115785 A | 6/2012 | |
| JP | 2012-210598 A | 11/2012 | |
| JP | 2013-685 A | 1/2013 | |
| JP | 2013-255901 A | 12/2013 | |
| JP | 2015-123418 A | 7/2015 | |
| JP | 5969685 B1 | 8/2016 | |
| JP | 2017-170388 A | 9/2017 | |
| JP | 2019-34399 A | 3/2019 | |
| WO | WO-2006021013 A1 * | 3/2006 | ........... B02C 17/007 |
| WO | WO-2012164126 A1 * | 12/2012 | ............. B07C 5/342 |
| WO | WO-2013042185 A1 * | 3/2013 | ........... B25J 9/0093 |
| WO | WO-2017106263 A1 * | 6/2017 | ........... B25J 13/085 |

OTHER PUBLICATIONS

Izeki; Yasuto, "Crusher, Classifier, Crushing and Classification (English Translation)", May 16, 2000, worldwide.espacenet.com (Year: 2000).*

Yano; Koji, "Handling System (English Translation)", Mar. 28, 2013, worldwide.espacenet.com (Year: 2013).*

Schulz; Detlef, "Method and Device for the Mechanical Separation of Metal-Containing Plastic Mixtures and Composites" (English Translation), Jun. 30, 1994, worldwide.espacenet.com (Year: 1994).*

Panowitz; Guenther, "Installation for the Selective Treatment of unsorted or Pre-Sorted Waste Material" (English Translation), Mar. 2, 2006, worldwide.espacenet.com (Year: 2006).*

English translation of the Japanese Notice of Reasons for Refusal for corresponding Japanese Application No. 2019-081346, dated Aug. 30, 2022.

International Search Report for PCT/JP2020/017390 mailed on Jun. 23, 2020.

International Preliminary Report on Patentability for PCT/JP2020/017390 mailed on Nov. 4, 2021.

Extended European Search Report dated Feb. 16, 2023 for corresponding Application No. 20796350.5.

* cited by examiner

PROCESSING METHOD AND PROCESSING DEVICE FOR ELECTRONIC/ELECTRICAL DEVICE COMPONENT SCRAP

FIELD OF THE INVENTION

The present invention relates to a method and device for processing electronic and electrical device component scrap. More particularly, it relates to a method and device for processing electronic and electrical device component scrap which can be utilized for recycling steps of used electronic and electrical devices.

BACKGROUND OF THE INVENTION

From the viewpoint of recent resource conservation, recovery of variable metals from electronic and electrical device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with copper smelting in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device component scrap processed may lead to an increase in a carbon component contained in organic substances such as resins forming the electronic and electrical device component scrap, which may cause troubles due to over-reduction in the smelting furnace. On the other hand, since the amount of the electronic and electrical device component scrap processed tends to be increased in recent years, there is a need for efficient processing in the copper smelting flash furnace.

As one of methods for suppressing the generation of troubles due to over-reduction in the copper smelting flash furnace, it is proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

CITATION LIST

Patent Literatures

[Patent Literature 1] Japanese Patent Application Publication No. H09-78151 A
[Patent Literature 2] Japanese Patent Application Publication No. 2015-123418 A

SUMMARY OF THE INVENTION

However, the increased amount of electronic and electrical device component scrap processed leads to introduction of a larger amount of unwanted substances (smelting inhibitors) for processing in the subsequent copper smelting step than that of the prior arts, depending on types of substances contained in the electronic and electrical device component scrap. An increased amount of such smelting inhibitors introduced into the copper smelting step arises a situation where an amount of the electronic and electrical device component scrap to be introduced has to be limited.

Conventionally, many efforts have been made for thermodynamic methods in a smelting step and purifying methods for electrolytic solutions in an electrolytic step of copper smelting, including the smelting inhibitors derived from natural ores. However, there are many problems in the method for processing the electronic and electrical device component scrap having very high contents of the smelting inhibitors than the natural ores.

For example, in order to efficiently produce raw materials to be fed into the smelting step while reducing smelting inhibitors from electronic and electrical device component scrap, it is desirable to perform mechanical processing using various sorters in terms of efficiency. However, the electronic and electrical device component scrap contains various shapes and types of component scrap, and some of the component scrap may cause problems in the sorting step, resulting in a decrease in processing efficiency.

The present disclosure provides a method and device for processing electronic and electrical device component scrap, which can efficiently reduce component scrap in a short period of time that will cause problems in the sorting step of smelting raw materials, which sorts a processing raw material containing valuable metals to be processed in the smelting step from electronic and electrical device component scrap.

In an embodiment, a method for processing electronic and electrical device component scrap according to an embodiment of the present invention includes a smelting raw material sorting step of sorting a processing raw material containing valuable metals processable in a smelting step from the electronic and electrical device component scrap, wherein the method includes removing lump copper wire scrap contained in the electronic and electrical device component scrap using a parallel link robot.

In another embodiment of the present invention, a method for processing electronic and electrical device component scrap includes conveying the electronic and electrical device component scrap on a conveying surface; performing image recognition processing of lump copper wire scrap contained in the electronic and electrical device component scrap conveyed on the conveying surface; and based on image recognition results obtained by the image recognition processing, discharging the lump copper wire scrap on the conveying surface using a parallel link robot.

In an embodiment of the present invention, a device for processing electronic and electrical device component scrap includes: a conveying device having a conveying surface for conveying the electronic and electrical device component scrap; an image recognition device which performs image-recognition of lump copper wire scrap contained in the electronic and electrical device component scrap conveyed on the conveying surface; and a picking device which discharges the lump copper wire scrap on the conveying surface using a parallel link robot based on image recognition results obtained by the image recognition device.

According to the present disclosure, it is possible to provide a method and device for processing electronic and electrical device component scrap which can efficiently reduce component scrap in a short period of time that will cause problems in the sorting step of smelting raw materials, which sorts processing raw materials containing valuable metals to be processed in the smelting step from the electronic and electrical device component scrap.

DETAILED DESCRIPTION OF THE INVENTION

Hereinafter, a method and device for processing electronic and electrical device component scrap 5 according to an embodiment of the present invention are described with reference to the drawings. Embodiments set forth below are examples of devices and methods for embodying a technical idea of the present invention, and the technical idea of the present invention are not intended to specify structures, arrangements, and the like of components to those described below.

Figure 1:
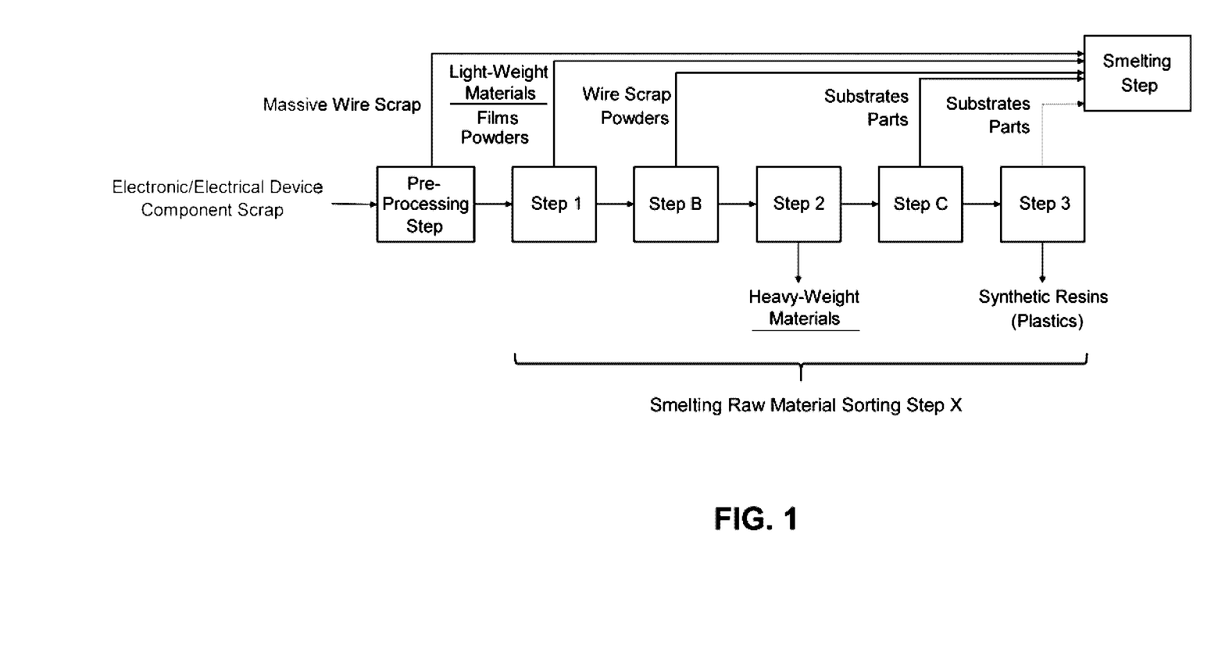
FIG. 1 is a flow chart showing an example of methods for processing electronic and electrical device component scrap according to an embodiment of the present invention.

As shown in FIG. 1, a method and device for processing electronic and electrical device component scrap 5 according to an embodiment of the present invention include: a smelting raw material sorting step X for sorting a processing raw material containing valuable metals that can be processed in a smelting step from the electronic and electrical device component scrap 5; and a preprocessing step of the smelting raw material sorting step X, wherein the preprocessing step includes a picking step Y for removing lump copper wire scrap contained in the electronic and electrical device component scrap 5.

As used herein, the "electronic and electrical device component scrap 5" refers to scrap obtained by crushing electronic and electrical devices such as waste home electric appliances, PCs, and mobile phones, recovering them and then crushing them to have an appropriate size. In the present invention, the crushing for obtaining the electronic and electrical device component scrap 5 may be performed by an operator. However, crushed objects may be purchased on the market.

The crushing method is carried out by any apparatus that is not limited to a specific apparatus, and may be carried out in sharing or shock manner. It is desirable to carry out crushing such that the shape of the component is maintained as much as possible. Therefore, the apparatus does not include one belonging to the category of a crusher for the purpose of fine crashing.

The electronic and electrical device component scrap 5 can be classified into component scrap consisting of synthetic resins (plastics) used for substrates, parts such as ICs and connectors, and casings; wire scraps; metals; film-shaped component scrap; powders generated by crushing or pulverizing; and others, and they can be further classified into subclasses depending on purposes of the processing. In the present embodiment, the electronic and electrical device component scrap 5 that has been crushed to have a particle diameter of 50 mm or less and has a percentage of individual components separated as component scrap of 70% or more may preferably be processed, although not limited thereto.

When the sorted materials are used in the copper smelting step, for example, the processing of those various types of component scrap in a predetermined order can provide a processing raw material that has concentrated valuable metals, including gold, silver, platinum, palladium, and copper, while reducing unwanted substances for processing in the copper smelting step as much as possible, for example, smelting inhibitors such as elements such as antimony (Sb) and nickel (Ni), resins, aluminum (Al), and iron (Fe).

The smelting raw material sorting step X preferably includes at least one of a wind force sorting step, a sieving step, a magnetic force sorting step, an eddy current sorting step, a specific gravity sorting step, and an optical sorting step of optically sorting metal materials from non-metal materials.

In particular, the smelting raw material sorting step X including at least two-step wind force sorting step and a sorting step using a metal sensor is advantageous in that valuable metals can be concentrated to a higher concentration into the processing raw material to be processed in the smelting step, while suppressing contamination of the smelting inhibitors in the processing raw material, and that the loss of valuable metals can be minimized. The smelting raw material sorting step X will be described later in detail.

The electronic and electrical device component scrap 5 (raw material) introduced to the smelting raw material sorting step X includes component scrap crushed into various shapes, sizes, and types depending on disposal companies and other factors, and the proportion of component scrap often varies.

As a result of studies, the present inventors have found that scrap of copper wire in a massive form (referred to as "lump copper wire scrap" in this embodiment) contained in the electronic and electrical device component scrap 5 (raw material) has an adverse effect on various sorters used in the smelting raw material sorting step X.

Therefore, in this embodiment, as the preprocessing step of the smelting raw material sorting step X, the picking step is carried out to remove lump copper wire scrap contained in the electronic and electrical device component scrap 5 as an initial raw material. The picking step carried out before the smelting raw material sorting step X can suppress any failure and false detection of the sorter in the smelting raw material sorting step X which will be described later, so that a large amount of the initial raw material can be mechanically and efficiently processed to obtain a processing raw material which has enriched valuable metals and can be processed in the smelting step.

In the picking step it is preferable to remove lump copper wire scrap having a long diameter of 10 mm or more, more preferably a long diameter of 20 mm or more, and even more preferably a long diameter of 45 mm or more. Although the lump copper wire scrap often has an irregular shape, a length of the longest part of the lump copper wire scrap is referred to as the "long diameter" in this embodiment. The upper limit of the long diameter of the lump copper wire scrap may be 100 mm or less, which is suitable for processing in the smelting raw material sorting step X, more typically 70 mm or less, although not particularly limited thereto.

The removal of such lump copper wire scrap as the preprocessing step in the smelting raw material sorting step X can prevent the lump copper wire scrap from being entangled with other component scrap and coarsening to generate deterioration of removal accuracy and clogging in an interior of a wind sorter, for example, when the sorting step is performed using the wind sorter. Further, since many of the components of the lump copper wire scrap contained in the electronic and electrical device component scrap 5 often contain a large amount of copper which is a valuable metal, the lump copper wire scrap can be recovered and effectively used as a part of the processing raw material to be fed into the smelting step.

The picking step can be automatically carried out using a robot to process a large amount of electronic and electrical device component scrap 5 in a short period of time. Various types of industrial robots can be used as the robot, among which a picking device 100 including a parallel link robot 1 may be used.

Figure 2:
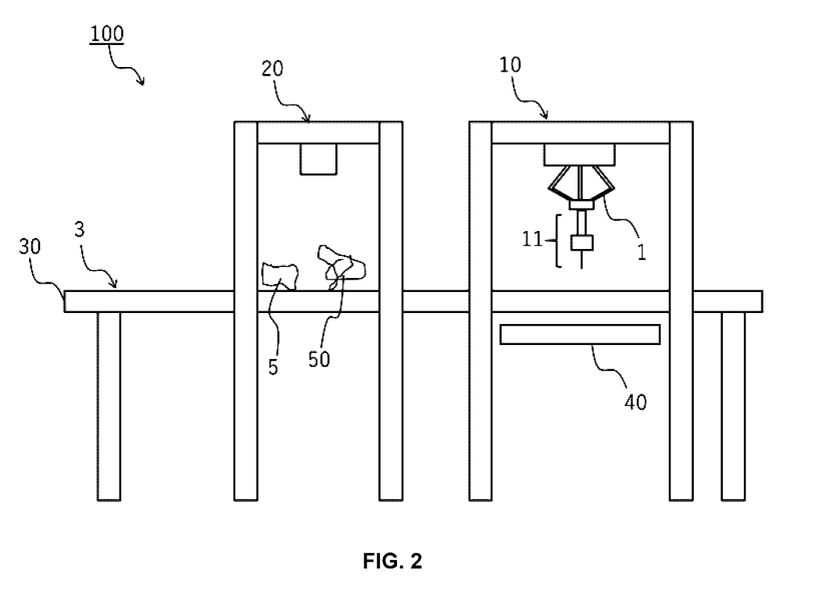
FIG. 2 is a side view showing an example of devices for processing electronic and electrical device component scrap according to an embodiment of the present invention.

FIG. 2 shows a side view of an example of the picking device 100 according to an embodiment of the present invention. As shown in FIG. 2, the picking device 100 includes: a conveying device 30 having a conveying surface 3 for conveying electronic and electrical device component scrap 5; an image recognition device 20 for image-recognizing lump copper wire scrap 50 contained in the electronic and electrical device component scrap 5 conveyed on the conveying surface 3; and a picking device 10 for discharging the lump copper wire scrap 50 on the conveying surface 3 using the parallel link robot 1 based on results of the image recognition.

The electronic and electrical device component scrap 5 is fed along a conveying direction on the conveying surface 3, and image recognition processing is performed by the image recognition device 20. The image recognition device 20 can include, for example, an irradiation device for irradiating the conveying surface 3 with illumination light; an imaging device for capturing images of the electronic and electrical device component scrap 5 present in a field of view irradiated by the irradiation device; and a control device (not shown) for controlling the irradiation device and the imaging device. Based on the images captured by the imaging device, the control device is configured to extract the lump copper wire scrap 50 whose long diameter is a predetermined length or whose area is a predetermined area or more, based on a predetermined program for extracting the lump copper wire scrap 50 from the electronic and electrical device component scrap 5, and to output the extraction results to the picking device 10.

The image recognition device 20 preferably determines position information of the lump copper wire scrap 50 to be removed by the picking device 10 from the images captured by the imaging device, based on the color (copper color) and area or long diameter of the lump copper wire scrap 50. The electronic and electrical device component scrap 5 contains various types of component scrap, but the lump copper wire scrap 50 has substantially similar color (copper color) regardless of its type. Therefore, the lump copper wire scrap 50 is recognized based on the color, whereby the lump copper wire scrap 50 to be processed can be easily determined from the electronic and electrical device component scrap 5 containing various types of component scrap. Further, in order to remove in advance the lump copper wire scrap 50 that will cause problems in the smelting raw material sorting step X, the information on the lump copper wire scrap 50 to be removed is extracted based on the area of the electronic and electrical device component scrap 5, and the position of the center of gravity to be picked by the picking device 100 as described below is determined from that area, so that it is possible to reduce picking errors in the picking step by the parallel link robot 1.

After the electronic and electrical device component scrap 5 is recognized by the image recognition device 20, it is picked by the picking device 10. The picking device 10 includes the parallel link robot 1 which is arranged above the conveying surface 3 and removes the lump copper wire scrap 50 based on the position information of the lump copper wire scrap 50 acquired by the image recognition device 20. The parallel link robot 1 moves to the target position in the shortest distance by the parallel link mechanism. Therefore, among industrial robots, the parallel link robot 1 can move to the position of the substance to be extracted at a higher speed and with higher accuracy, grasp the substance, and feed it to a predetermined position at a higher speed. Accordingly, by using the parallel link robot 1 to remove the lump copper wire scrap 50 contained in the electronic and electrical device component scrap 5, the lump copper wire scrap 50 can be extracted at a higher speed and with higher accuracy than those of conventional articulated robots and the like.

Figure 3:
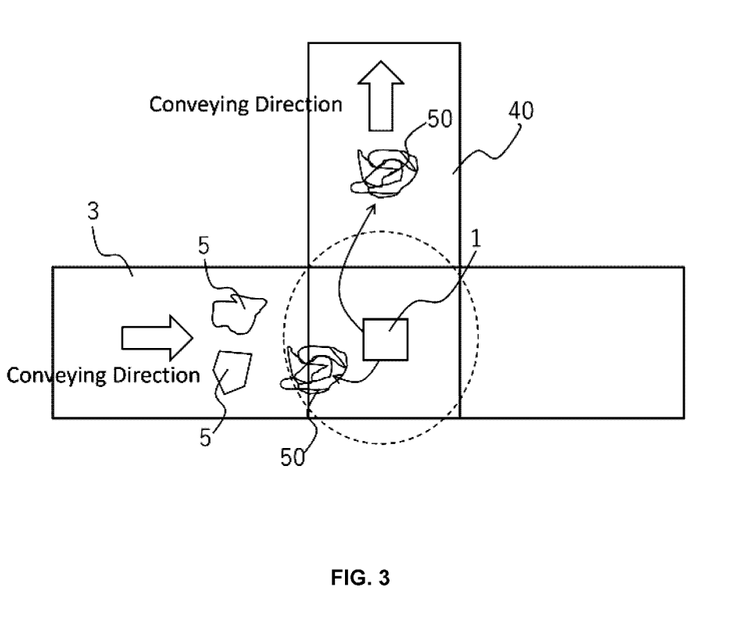
FIG. 3 is a top view showing an example of devices for processing electronic and electrical device component scrap according to an embodiment of the present invention.

As shown in FIG. 3, the parallel link robot 1 grips and discharges the lump copper wire scrap 50 from the conveying surface 3 to a discharging device 40 having a conveying direction so as to be across the conveying surface 3 of the conveying device 30, typically in a direction intersecting perpendicularly to the conveying direction. Thus, the discharge device 40 is arranged near the conveying surface 3 and the parallel link robot 1, and the parallel link robot 1 is configured to discharge the lump copper wire scrap 50 in a direction that is across the conveying direction of the conveying device 30, whereby the lump copper wire scrap 50 can be removed from the electronic and electrical device component scrap 5 in a short period of time with higher accuracy.

As shown in FIG. 2, the parallel link robot 1 is provided with one or more robot hands 11 at the end. If only one robot hand 11 is connected to the end of the parallel link robot 1, the parallel link robot 1 may not be able to remove the lump copper wire scrap 50 completely, when a large amount of lump copper wire scrap 50 is conveyed on the conveying surface 3. Therefore, it is preferable that a plurality of the robot hands are connected to the end of the parallel link robot 1. However, if a large number of robot hands 11 are connected, the total weight of robot hands 11 supported by the parallel link robot 1 will be increased, which may reduce a processing rate of the parallel link robot 1. Therefore, it is desirable that the number of robot hands 11 is adjusted to a suitable number depending on an existence ratio of the lump copper wire scrap 50 contained in the electronic and electrical device component scrap 5 to be conveyed on the conveying surface 3, or on the processing rate.

Figure 4:
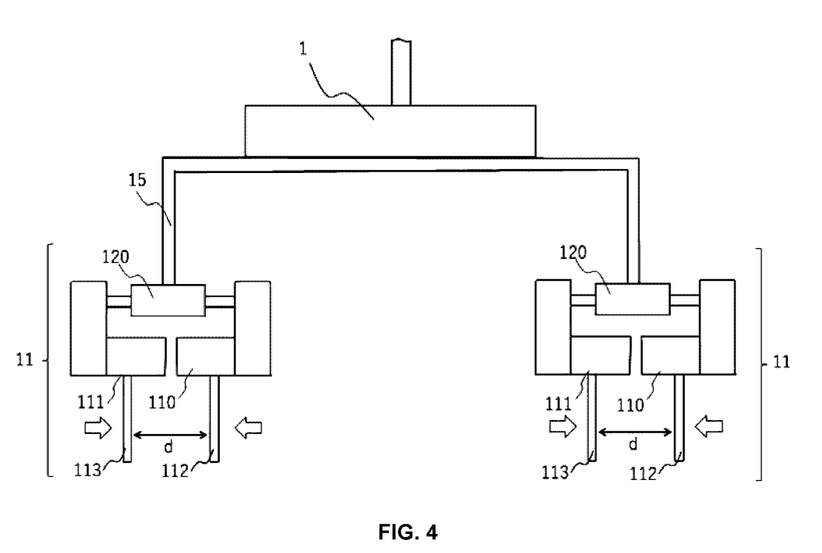
FIG. 4 is a schematic view showing an arrangement example of robot hands attached to a tip of a parallel link robot.

As shown in FIG. 4, each robot hand 11 can include: holding portions 110, 111 having a pair of gripping portions 112, 113 at their ends for gripping the lump copper wire scrap 50; and a drive portion 120 for driving the holding portions 110, 111 holding the gripping portions 112, 113 in a horizontal direction to adjust a distance d between the gripping portions 112, 113 (to open and close the gripping portions 112, 113) in order to grip the lump copper wire scrap 50.

The drive portion 120 can be comprised of an air cylinder or the like. The gripping portions 112, 113 wait in the open state (in the state where the gripping portions are opened when the previously gripped massive copper scrap is discharged), and when the target massive copper scrap 50 is detected, the drive portion 120 confirms the position and the parallel link robot 1 immediately moves to the massive copper scrap 50 to insert the gripping portions 112, 113 into the massive copper scrap 50, and the gripping portions 112, 113 are brought closer to each other by the drive portion 120, and they are closed to sandwich the massive copper scrap 50 between the gripping portions 112, 113.

The parallel link robot 1 which has gripped the lump copper wire scrap 50 moves across the conveying direction of the conveying device 30 toward a discharge port, while driving the drive portion 120 so as to open the space between the grasping portions 112, 113 to discharge the gripped lump copper wire scrap 50 via the discharge port. The parallel link robot 1 returns to its fixed position with the gripping portions 112, 113 remaining open. The embodiment in FIG. 4 illustrates an example where two robot hands 11 are connected to the tip of the parallel link robot 1 via an arm 15.

Figure 5:
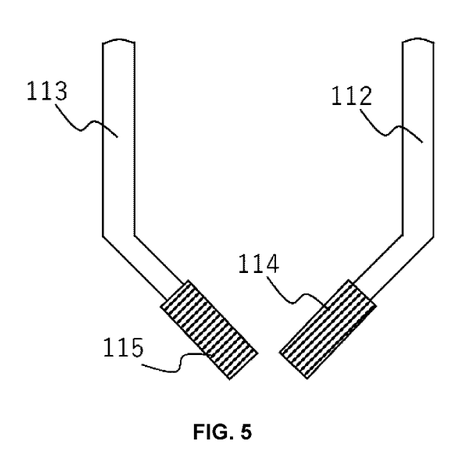
FIG. 5 is a schematic view showing an arrangement example of tip portions of robot hands.

Each of the gripping portions 112, 113 may have any shape. However, preferably, each of them has a shape that does not entangle the lump copper wire scrap. For example, each of the gripping portions preferably has a prismatic pillar shape with no protrusion. As shown in FIG. 5, the gripping portions 112, 113 at the ends of the robot hands 11 are bent such that they approach each other toward the ends, and distal end portions of the gripping portions 112, 113 are provided with covering members 114, 115. The covering members 114, 115 can be formed of an elastic member such as silicon rubber. The provision of the covering members 114, 115 at the distal end portions of the gripping portions can lead to easy holding of the lump copper wire scrap 50 by the robot hands 11, and also prevent the gripping portions 112, 113 from being damaged by the lump copper wire scrap 50.

According to the device (picking device 100) and method for processing electronic and electrical device component scrap 5 according to the embodiment of the present invention, the lump copper wire scrap 50 contained in the electronic and electrical device component scrap 5 is removed using the parallel link robot 1, whereby the lump copper wire scrap 50 can be removed with higher accuracy and in a shorter period of time. This can allow component scrap that will cause problems in the smelting raw material sorting step X to be reduced in advance.

—Smelting Raw Material Sorting Step X—

As illustrated in FIG. 1, the smelting raw material sorting step X can include at least a step 1, a step 2, and a step 3. Further, depending on properties of the electronic and electrical device component scrap 5, steps B to C can be combined as appropriate before and after the steps 1 to 3.

(1) Step 1

In the step 1, powdery materials and film-shaped component scrap (resins, aluminum foils, and the like) as materials that would be adversely affected on the subsequent sorting step are selectively removed from the electronic and electrical device component scrap 5 that is the initial raw material. This serves as preprocessing for the subsequent step and is categorized as coarse sorting.

As the step 1, wind force sorting is preferably used. For the purpose of the present invention, this wind force sorting is characterized by an ability to process a large number of materials. By the wind force sorting, the materials were divided into light-weight materials and heavy-weight materials. The powdery materials and film-shaped scrap (resins, aluminum foils, and the like) as the light-weight materials are sent to a copper smelting step via a pre-incineration processing step, and the heavy-weight materials are sent to the step 2.

A flow rate of air in the step 1 can be set to 5 to 20 m/s, and more preferably 5 to 12 m/s, and further preferably about 5 to 10 m/s, and even more preferably 6 to 8 m/s, although not limited to those conditions.

(2) Step 2

In step 2, synthetic resins, substrates and parts are concentrated from the electronic and electrical device component scrap 5 from which the powdery materials and film-shaped component step has been removed.

As the step 2, wind force sorting is preferably used. In the step 2, massive metals or other individual components are separated as heavy-weight materials, and substrates, plastics and other synthetic resins are concentrated on the light-weight material side. The substrates and synthetic resins concentrated on the light-weight material side are sent to the step 3 that is the next step. Further, the heavy-weight materials are optionally subjected to a combination of magnetic force sorting, eddy current sorting, color sorter, manual sorting, robot sorting, and the like to recover metals such as Fe, Al and SUS which are present in the heavy-weight materials.

A flow rate of air in the step 2 can be set to 5 to 20 m/s, more preferably 10 to 18 m/s, further preferably 15 to 18 m/s, and even more preferably about 16 to 17 m/s, although not limited to those conditions.

(3) Step 3

In the step 3, substrates containing valuable metals such as copper, gold, and silver are concentrated from the light-weight materials containing the substrates, the synthetic resins, and the like obtained in the step 2. By concentrating the substrates containing the valuable metals and processing them in a copper smelting step as described later, a recovery efficiency of the valuable metals in the copper smelting step can be improved.

In the step 3, the processing is preferably carried out using a sorter including a metal sensor, a color camera, an air valve and a conveyor. In the step 3, first, the metal sensor detects the metals, the conveyer conveys and discharges the metals, and the subsequent color camera confirms positions of the substances. Then, based on information from the metal sensor and positional information from the color camera, it is preferable to carry out a process of selectively shooting down the components which are recognized as non-metal objects and are on a falling trajectory, by device of the air valve.

The substrates containing the valuable metals such as copper and precious metals are concentrated on the side of the sorted products that have not been shot down by the air valve. Therefore, those substrates can be used as processing objects to increase an efficiency of recovering valuable metals with a less amount of component scrap introduced.

On the other hand, the substrates and the synthetic resins that are substantially free of metal, shot down by the air valve, may contain one or more metals selected from the group consisting of Sb, Al, Fe and Ni, which will be smelting inhibitors in a smelting step as described later. By sending the component scrap containing such smelting inhibitors to the smelting step, it may be difficult to perform the smelting step stably, so that it may be difficult to recover the valuable metals with a high efficiency.

According to the processing method of the present embodiment, by the step 3, the component scrap and the like containing at least one or more metals selected from the group consisting of Sb, Al, Fe, and Ni which are the smelting inhibitors can be removed in advance, thereby preventing the smelting inhibitors contained in the electronic and electrical device component 5 from being brought as much as possible.

In addition, when the powdery materials or the film-shaped component scrap are contaminated into the processing objects in the process of the step 3, the metal sorter results in deterioration of the field of view of the color camera by flowing up the powdery materials and the like during the sorting, so that it may be difficult to specify the removing objects using the color camera, or the color camera may erroneously detect the removing objects and the air valve may be erroneously operated to cause non-objects to be caught into the valve.

According to the method according to the embodiment of the present invention, the powdery materials, the film-shaped component scrap and the like contained in the electronic and electrical device component scrap 5, which causes a decrease in the sorting efficiency in the sorting step, have been previously removed in the preprocessing step and the step B, so that it is possible to suppress malfunction of the metal sorter and the decrease in the sorting efficiency due to flowing-up of the powdery materials during the processing.

In a general physical sorting method for concentrating metals, the metals are first recovered by magnetic force sorting or the like. However, the magnetic force sorter has a risk that the component scrap containing the valuable metals may be contaminated into the magnetic material to decrease an amount of the valuable metals recovered.

According to the processing method according to the embodiment of the present invention, the wind force sorting is carried out in two stages (the step 1 and the step 2) in the initial stage of physical sorting, so that the loss of valuable metals can be suppressed, and a large amount of electronic and electrical device component scrap 5 (raw materials) can be sorted at once while concentrating a large amount of valuable metals, as compared with the case where the process of the magnetic force sorting is carried out. Then, after the two-stage wind force sorting, the sorting process (step 3) using the metal sorter, which requires a long processing time, can be combined, thereby removing the smelting inhibitors while increasing the amount of the electronic and electrical device component scrap 5 to recover the valuable metals efficiently.

As shown in FIG. 1, it is more preferable to combine the steps B and C before and after the steps 1 to 3 in terms of an improved sorting efficiency. For example, it is preferable to have the step B of removing the wire scrap contained in the electronic and electrical device component scrap 5 between the step 1 and the step 2. As the step B, the wire scrap is preferably removed using a sieving machine having a slit-shaped sieve. In the step B, the powdery materials can be removed in addition to the wire scrap by sieving. The sieved powdery materials and copper wire scrap can be sent to the smelting step via the pre-incineration processing step to recover the valuable metals in the component scrap more efficiently.

A step C may be carried out between the step 2 and the step 3. The step C includes at least one process of sorting with a color sorter, sorting with sieving, and sorting with magnetic force, and can be regarded as a pre-processing for the sorting process of the step 3. These sorting processes can be combined to decrease the metal content in the processing objects sent to the step 3.

A higher metal content in the processing objects device that there is a large amount of component scrap containing the metals. In the process using the metal sorter in the step 3, when there are non-metal objects such as synthetic resins between the component scraps detected as the metals, they may be erroneously detected as a single metal when a distance between the component scraps is within a detection range of the metal sorter, and the synthetic resins such as plastics, which are non-metal objects between the metal objects, may not repelled by the air valve and handled as metal-containing substrates or parts. Therefore, before carrying out the separation using the metal sorter in the step 3, the step C including the sorting with the magnetic force, the sieving, the color sorter, and the like can be carried out to decrease the metal content in the processing objects sent to the step 3 to suppress the erroneous detection of the metal sorter.

A part of the substrates to be processed in the copper smelting step may be contaminated into the heavy-weight materials obtained in the step 2. Therefore, the heavy-weight materials obtained in step 2 are further classified by a process such as magnetic force sorting, eddy current sorting, color sorter, manual sorting, and robot sorting, thereby separating the substrates to be processed in the copper smelting process to send them to the smelting the step. Therefore, the recovery efficiency of the valuable metals can be improved.

In addition, the "removed" or "separated" as used herein includes not only an embodiment of removal or separation of 100%, but also an embodiment of removal of 30% or more, more preferably 50% by mass or more in the weight ratio in the objects.

—Smelting Step—

A method for processing electronic and electrical device component scrap 5 according to an embodiment of the present invention further includes a smelting step of processing a processing raw material containing the lump copper wire scrap 50 obtained in the preprocessing step, valuable metals sorted in each of the steps 1 to 3 and the step B to C, in the smelting step.

When recovering copper as a valuable metal, the smelting step is carried out using a smelting furnace. The smelting step includes: a step of incinerating the electronic and electrical device component scrap 5; a step of crushing and sieving the incinerated scrap; and a step of subjecting the crushed and sieved scrap to copper smelting. The step of processing the electronic and electrical device component scrap 5 is preferably carried out prior to the incinerating step.

As the smelting step according to the present embodiment, a copper smelting step using a flash furnace method can be preferably employed, although not limited thereto. In the copper smelting step using the flash furnace method, for example, copper concentrates, a solvent, and the electronic and electrical device component scrap 5 are charged from a ceiling portion of a shaft of the flash furnace. The charged concentrates and the electronic and electrical device component scrap are melted in the shaft of the flash furnace to separate a mat containing, for example, from 50 to 68% of copper and slag floating above the mat in a settler of the flash furnace. Valuable metals such as copper, gold, and silver in the electronic and electrical device component scrap 5 are absorbed into the mat that is retained in the flash furnace, so that the valuable metals can be recovered from the electronic and electrical device component scrap 5.

In copper smelting, it is important to introduce the electronic and electrical device component scrap 5 having lager contents of valuable metals such as copper, gold and silver as the raw material to be processed, as much as possible, and carry out the processing, in order to produce copper and recover larger amounts of variable metals such as gold and silver. On the other hand, the electronic and electrical device component scrap 5 contains substances that would affect the quality of products and byproducts in copper smelting and/or smelting inhibitors that would affect the copper smelting process. For example, the introduction of an increased amount of substances containing elements such as Sb and Ni as described above may lead to deterioration of the quality of electrolytic copper obtained by copper smelting.

Further, in a non-ferrous metal smelting step such as copper smelting, sulfuric acid is produced from sulfur dioxide generated by oxidation of concentrates. However, when hydrocarbon is mixed into sulfur dioxide, the produced sulfuric acid may be colored. Examples of sources of hydrocarbons include synthetic resins such as plastics, and a large amount of such synthetic resins may be contained depending on the composition of the electronic and electrical device component scrap 5 carried into the copper smelting. The synthetic resins may also cause rapid combustion and smoke leakage in the smelting furnace, and even deterioration of equipment due to local heating.

Furthermore, for example, the presence of Al, Fe, or the like over a certain concentration in the smelting furnace may lead to a change of a slag composition in the process of copper smelting, which may affect the loss of valuable metals into the slag, so-called slag loss. Moreover, a large amount of halogen elements such as Cl, Br, and F contained in the electronic and electrical device component scrap 5 to be introduced into the smelting furnace may cause corrosion of exhaust gas treatment equipment for copper smelting and deterioration of a sulfuric acid catalyst. Such a problem of contamination of the smelting inhibitors becomes apparent as an amount of the electronic and electrical device component scrap 5 processed is increased, which cases a problem that the smelting step is burdened.

The method for processing the electronic and electrical device component scrap 5 according to an embodiment of the present invention includes, prior to the smelting step, a physical sorting step of the electronic and electrical device component scrap 5 including the preprocessing step and the smelting raw material sorting step X, as shown in FIG. 1. This can allow a proportion of smelting inhibitors that are carried into the smelting step to be minimized, and allow an amount of the electronic and electrical device component scrap 5 processed to be increased, and allow the proportion of the electronic and electrical device component scrap 5 containing copper and valuable metals to be increased to recover copper and valuable metals efficiently.

It is more preferable that a larger amount of the smelting inhibitors contained in the electronic and electrical device component scrap 5 is removed. However, there is component scrap having the smelting inhibitors and the valuable metals at the same time, depending on the type of the component scrap. By removing ½, more preferably ⅔ or more, in a weight ratio, of the smelting inhibitors in the entire raw material of the electronic and electrical device component scrap 5, the electronic and electrical device component scrap 5 can be stably processed in the copper smelting step. Furthermore, assuming that a limit amount that can process the smelting inhibitors is the same as the present limit in the smelting process, the smelting inhibitors in the entire raw material of the electronic and electrical device component scrap 5 are decreased, whereby a larger amount of electronic and electrical device component scrap 5 containing a decreased amount of the smelting inhibitors can be processed in the smelting step.

According to the method for processing the electronic and electrical device component scrap 5 according to the embodiment of the present invention, it is possible to provide a method for processing electronic and electrical device component scrap 5, which includes a physical sorting step of sorting and removing component scrap containing smelting inhibitors for each unit of components in the state of the component scrap before crushing the electronic and electrical device component scrap 5 into powder in the smelting step, whereby a processing amount of the electronic and electrical device component scrap 5 to be processed in the smelting process can be increased, and valuable metals can be efficiently recovered.

The present invention is not limited to the present embodiments, and it can be embodied by modifying the components without departing from the spirit of the present invention. Also, various inventions can be formed by appropriate combinations of the multiple components disclosed in the present embodiments. For example, some of the components may be deleted from all the components shown in the embodiment, or the respective components may be combined as appropriate.

DESCRIPTION OF REFERENCE NUMERALS

1 . . . parallel link robot
3 . . . conveying surface
5 . . . electronic and electrical device component scrap
10 . . . picking device
11 . . . robot hand
15 . . . arm
20 . . . image recognition device
30 . . . conveying device
40 . . . discharge device
50 . . . lump copper wire scrap
100 . . . picking device
110, 11 . . . holding portion
112, 113 . . . gripping portion
114, 15 . . . covering member
120 . . . drive portion

The invention claimed is:

1. A method for processing electronic and electrical device component scrap comprising:
 a smelting raw material sorting step of sorting a processing raw material containing valuable metals processable in a smelting step from the electronic and electrical device component scrap; and
 a preprocessing step of removing lump copper wire scrap contained in the electronic and electrical device component scrap using a parallel link robot before the smelting raw material sorting step,
 wherein the smelting raw material sorting step comprises:
  a first wind force sorting step for removing powdery materials and film-shaped component scraps in the electronic and electrical device component scrap; and
  a second wind force sorting step for sorting the electrical device component scrap in which the powdery materials and the film-shaped component scraps are removed to concentrate light-weight materials containing substrates, synthetic resins, and parts on a light-weight material side and separate heavy-weight materials comprising metals on a heavy-weight material side,
 and wherein the first wind force sorting step is performed as an initial step of the smelting raw metal sorting step and the lump copper wire scrap is removed in the preprocessing step before the smelting raw metal sorting step.

2. The method for processing electronic and electrical device component scrap according to claim 1, wherein the parallel link robot comprises one or more robot hands at an end portion of the parallel link robot, wherein each of the one or more robot hands comprises: holding portions having a pair of gripping portions for gripping the lump copper wire scrap at their ends; and a drive portion for driving the holding portions to adjust a distance between the gripping portions.

3. The method for processing electronic and electrical device component scrap according to claim 2, wherein each of distal end portions of the gripping portions comprises a covering member.

4. The method for processing electronic and electrical device component scrap according to claim 1,
wherein the preprocessing step further comprises: an image recognition step of recognizing at least color and size of the lump copper wire scrap present in the electronic and electrical device component scrap before a step of removing the lump copper wire scrap,
wherein the lump copper wire scrap is removed by the parallel link robot, based on position information of the lump copper wire scrap obtained in the image recognition step.

5. The method for processing electronic and electrical device component scrap of claim 4, further comprising:
conveying the electronic and electrical device component scrap on a conveying surface before performing the image recognition step.

6. The method for processing electronic and electrical device component scrap according to claim 1, wherein the parallel link robot discharges the lump copper wire scrap in a direction that is transverse to a conveying direction where the electronic and electrical device component scrap is conveyed.

7. The method for processing electronic and electrical device component scrap according to claim 1, wherein the smelting raw material sorting step further comprises at least one of a sieving step, a magnetic force sorting step, an eddy current sorting step, and an optical sorting step of optically sorting metal materials from non-metal materials.

8. The method for processing electronic and electrical device component scrap according to claim 1, wherein the smelting raw material sorting step further comprises:
a metal sorting step of sorting the light-weight materials comprising the substrates, the synthetic resins, and the parts to concentrate substrates containing valuable metals by using a metal sorter after the second wind force sorting step.

9. A device for processing electronic and electrical device component scrap, comprising:
a first wind force sorter configured to receive the electronic and electrical device component scrap and perform wind power sorting to remove powdery materials and film-shaped component scraps in the electronic and electrical device component scrap;
a second wind force sorter configured to receive the electrical device component scrap in which the powdery materials and the film-shaped component scraps are removed and configured to concentrate light-weight materials containing substrates, synthetic resins, and parts on a light-weight material side, and separate heavy-weight materials comprising metals on a heavy-weight material side;
a conveying device having a conveying surface which conveys the electronic and electrical device component scrap which is before introducing the first wind sorter;
an image recognition device which performs image-recognition processing of lump copper wire scrap contained in the electronic and electrical device component scrap conveyed on the conveying surface; and
a picking device which discharges the lump copper wire scrap on the conveying surface using a parallel link robot based on image recognition results obtained by the image recognition device.

* * * * *